United States Patent [19]

Montagnino

[11] 3,917,090
[45] Nov. 4, 1975

[54] POSTAGE METER TAPE RECEPTICLE SYSTEM

[75] Inventor: James G. Montagnino, Monroe, Conn.

[73] Assignee: Pitney-Bowes, Inc., Stamford, Conn.

[22] Filed: Nov. 2, 1973

[21] Appl. No.: 412,326

[52] U.S. Cl. .......... 214/146.5; 214/1 BD; 242/55.53
[51] Int. Cl.² ......................................... B65G 65/00
[58] Field of Search ... 214/1 BD, 1 R, 130 R, 1 BB, 214/147 R, 147 T, 147 G, 152, 146.5, 148, 62 R; 242/55.2, 55.53, 79

[56] References Cited
UNITED STATES PATENTS

| | | | |
|---|---|---|---|
| 694,332 | 2/1902 | Sundt | 214/62 R |
| 928,286 | 7/1909 | Soltzfos et al. | 214/62 R |
| 2,649,256 | 8/1953 | Skrebba | 242/55.2 |
| 3,066,881 | 12/1962 | Krveger | 242/55.53 |
| 3,472,405 | 10/1969 | Bowman et al. | 214/146.5 |

*Primary Examiner*—Frank E. Werner
*Attorney, Agent, or Firm*—William D. Soltow, Jr.; Albert W. Scribner; Robert S. Salzman

[57] ABSTRACT

A receptacle system for loading postage meter tape into a postage tape dispensing machine. The receptacle system comprises, a container for the postage tape which container is slidably movable within the dispensing machine. When a new roll of tape is to be inserted in the machine, the receptacle is withdrawn from its tape dispensing position within the machine to an easily accessible position at the front of the machine. A new roll of tape is then drop loaded into the container, and the container and roll are both pushed back into the machine to the tape dispensing position.

3 Claims, 6 Drawing Figures

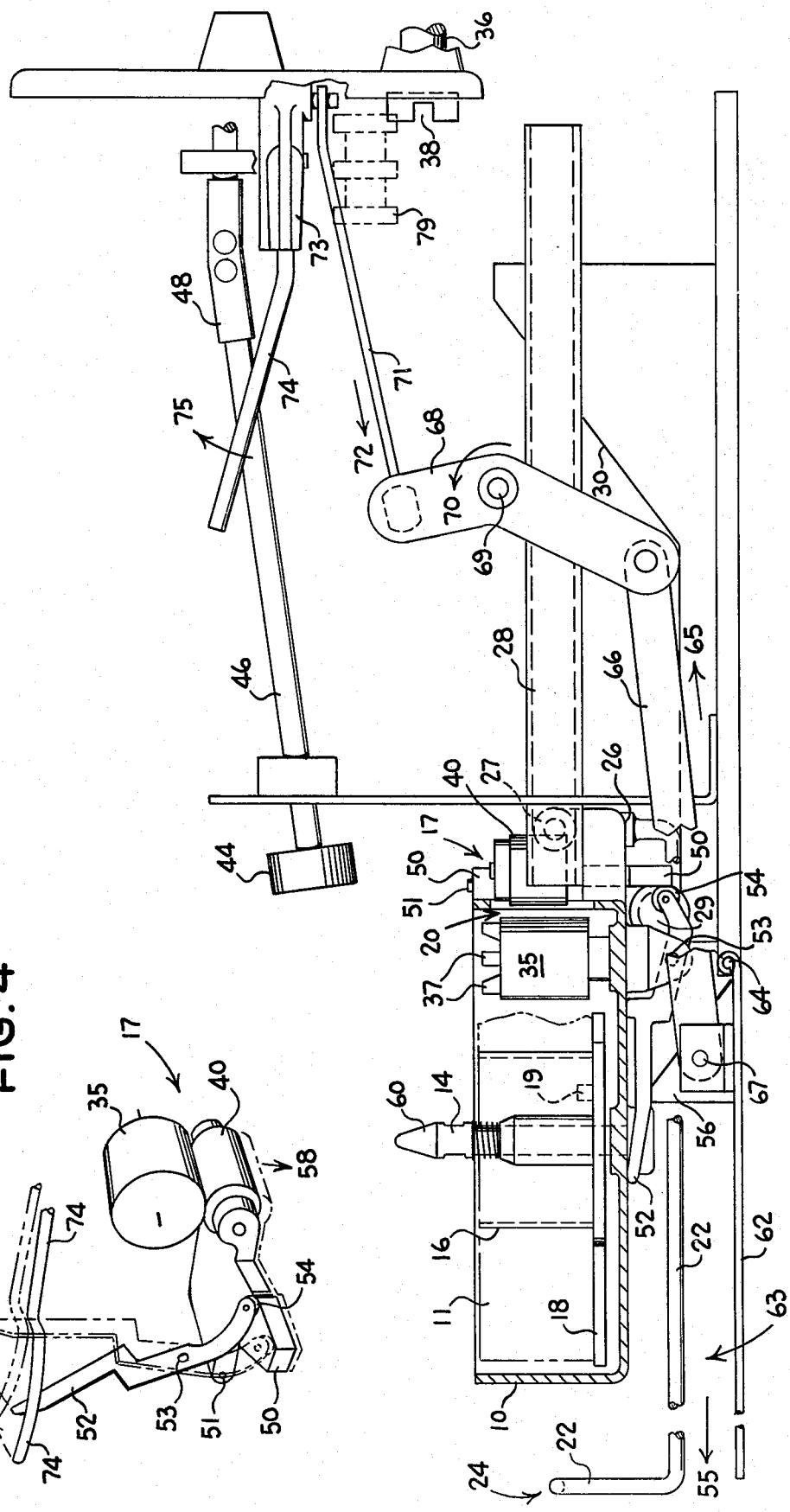
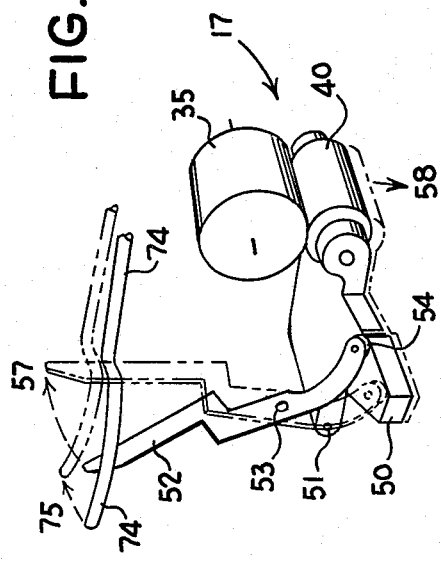
FIG. 2
FIG. 4

POSTAGE METER TAPE RECEPTICLE SYSTEM

This invention pertains to postage meter tape dispensing machines, and more particularly to a postage meter tape loading system and method.

BACKGROUND OF THE INVENTION

Heretofore, the loading of postage meter tape into a postage tape dispensing system was fraught with several difficulties. For one thing, the loading position for the tape was inconveniently recessed within the dispensing apparatus, making it cumbersome to load the tape. For another thing, once loaded the removal of the tape if jamming occurred, was equally cumbersome.

The present receptacle loading system was conceived in order to correct the aforementioned problems. The invention provides a mechanism for easily loading the tape into the dispensing machine.

SUMMARY OF THE INVENTION

The inventive tape loading system comprises a container into which a roll of postage tape is drop-loaded. A given quantity of tape is dispensed from said roll through an aperture in the container. The container has a rotatable support disposed therein, which allows the roll to rotate and continuously supply a quantity of tape to the aperture for dispensing purposes.

The tape receptacle is easily loaded, because it is slidably supported within the dispensing machine, and can be removed from the inner reaches of the dispensing device to an easily accessible loading position. This is accomplished by means of a set of tracks upon which the container is made to slide.

After the container is pulled outwardly from the machine, a roll of tape is drop-loaded therein, and the container is returned to the dispensing apparatus. The tape is then engaged by the dispensing mechanism, and is dispensed therefrom until such time as the tape is depleted. When the tape is exhausted, the container is again removed from the machine to the tape loading position to accept a new charge of tape.

It is an object of the invention to provide an improved postage meter tape loading system;

It is another object of this invention to provide an improved postage meter tape loading method;

It is a further object of the invention to provide a tape loading apparatus for a tape dispensing machine which provides ease of handling and accessibility for loading the postage tape into the dispensing machine.

These and other objects of the invention will become more apparent and will be more readily understood with reference to the following detailed description read in conjunction with the accompanying drawings, in which:

FIG. 2 is a side view of the postage tape receptacle in the loading position showing a cut-away of the pinch rollers, said receptacle being shown in situ with the tape positioning apparatus of this invention, and the tape dispensing apparatus;

FIG. 3 is a perspective view of the tape loading apparatus of this invention showing the loaded postage tape receptacle being moved to a tape dispensing position, said receptacle showing a cut-away of the pinch rollers;

FIG. 4 is a perspective of the pinch roller mechanism, with a phantom view of the rollers being separated;

Generally speaking, the invention is for a novel postage tape receptacle and an apparatus for positioning the tape loaded receptacle within a tape dispensing machine. The tape receptacle comprises a container receiving a roll of postage meter tape. The container has a rotatable tape support and an aperture therein. The dispensing of the tape takes place through the aperture and is conjointly operative with the rotation of the tape within the container.

The overall tape receptacle system in addition to comprising the tape receiving and dispensing container, also comprises means for supporting and moving the container between a tape loading position and a tape dispensing position within the dispensing machine.

The dispensing machine as referred to in this application, pertains to the Pitney-Bowes Postage Metering System, Model 5600.

All mechanisms, operations, and functions of the aforementioned metering system are the same for this inventive description, unless otherwise mentioned herein.

Figure 1:
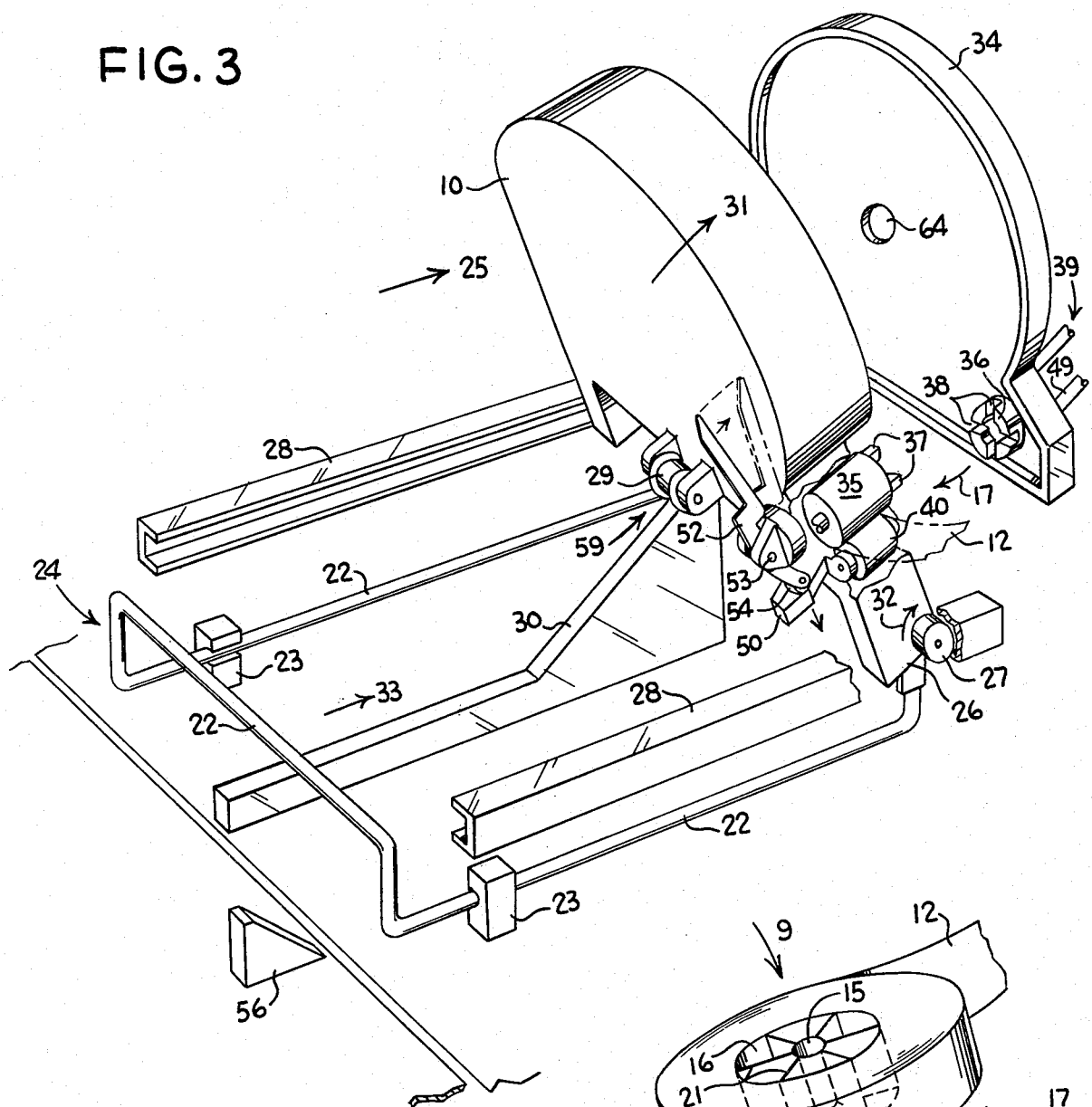
FIG. 1 is a perspective view of a reel of postage tape receptacle.

Now, referrring to FIGS. 1 and 2, a tape receptacle 10 for the receipt and dispensing of postage meter tape is shown. A roll of postage meter tape 11, is drop-load (arrow 9) into the container, by fitting the center hole 15 of the plastic mandrel 16 of tape 11, over the center shaft 14 of container 10.

The end flap 12 of tape 11 is then threaded between the pinch rollers, generally shown by arrow 17 in FIGS. 1 and 3, and is dispensed through aperture 20.

The container 10 has a rotatable platform 18 disposed in a bottom portion thereof, and rotatable portion about center shaft 14. When tape 11 is dispensed through the aperture 20, the tape 11 is made to rotate. The tape is free to rotate, because it is supported upon the rotatable platform 18. The tape 11 will not slip as it rotates, because it is locked to the platform 18 by means of pin 19, which fits within the fins 21 of the mandrel 16. When the tape is dispensed, pin 19 abuts one of the fin members 21, causing the tape and platform to turn as a unit.

Figure 6:
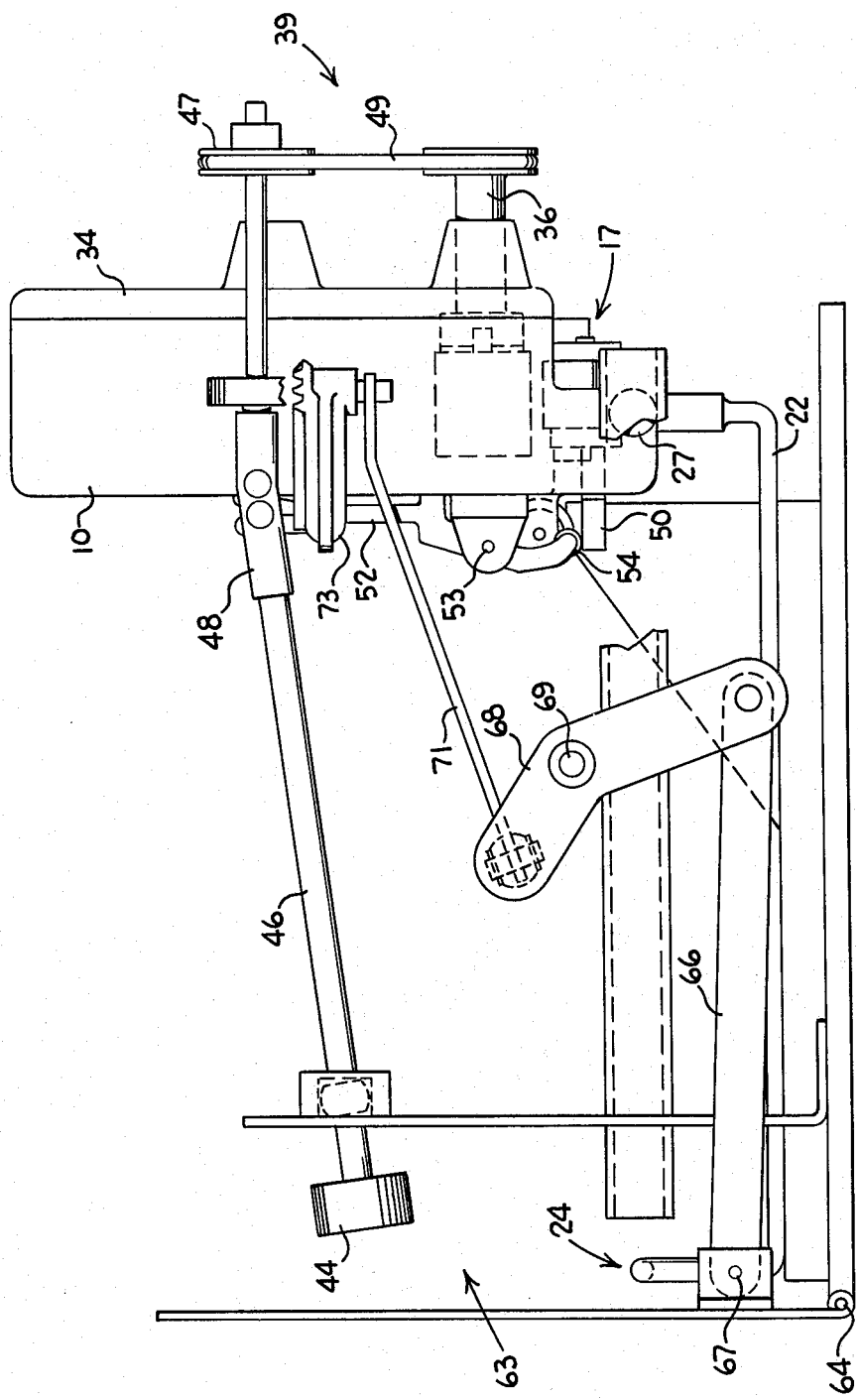
FIG. 6 is a side view similar to FIG. 2 showing the receptacle in the dispensing position.

After the tape has been loaded into the container 10, the receptacle is pushed (arrow 25 of FIG. 3) into the dispensing apparatus to a dispensing position therein (FIG. 6).

The receptacle 10 is pulled from, and pushed into, the dispensing position by means of slide bar 22, which is slidably supported in guides 23. One end of the slide bar 22 is in the form of a handle 24, so that it can be gripped by the tape loading operator. The other end of the bar 22 is attached to the receptacle 10 about its rear section 26. The rear section 26 supports a pair of rollers 27, which are made to roll within tracks 28. Thus, when the slide bar 22 is pushed or pulled, the receptacle 10 is caused to move along tracks 28.

Between tracks 28 is disposed an inclined track 30. A roller 29 attached to the container 10 is caused to roll upwardly upon track 30, when the slide bar 22 is forced inwardly (arrow 33). As roller 29 moves upwardly upon the inclined track 30, the container 10 is caused to pivot about rollers 27 (arrow 32) which causes the container to approach a vertical position (arrow 31). In the utmost vertical position, the container 10 is brought to a position abutting the lid 34, which is fastened to the wall of the machine. The roller 35, which forms a part of the pinch rollers 17, has a number of teeth 37 disposed on the end-face thereof. The teeth 37 are the male counterpart of the female depressions 38 of the rotative pulley element 36. When the container 10 abuts the lid 34, the male protrusions 37 of roller 35 seek to mate with the keying slots 38 of rotative pulley wheel 36. If the male and female sections are not in a mating position, they will eventually assume a mating condition as rotative element 36 is caused to turn. Rotative element 36 forms part of the pulley system, shown generally by arrow 39 (FIGS. 2–4). The pulley system 39 is used to move tape strip 12 into tape guide 41 as depicted in FIG. 5.

Figure 5:
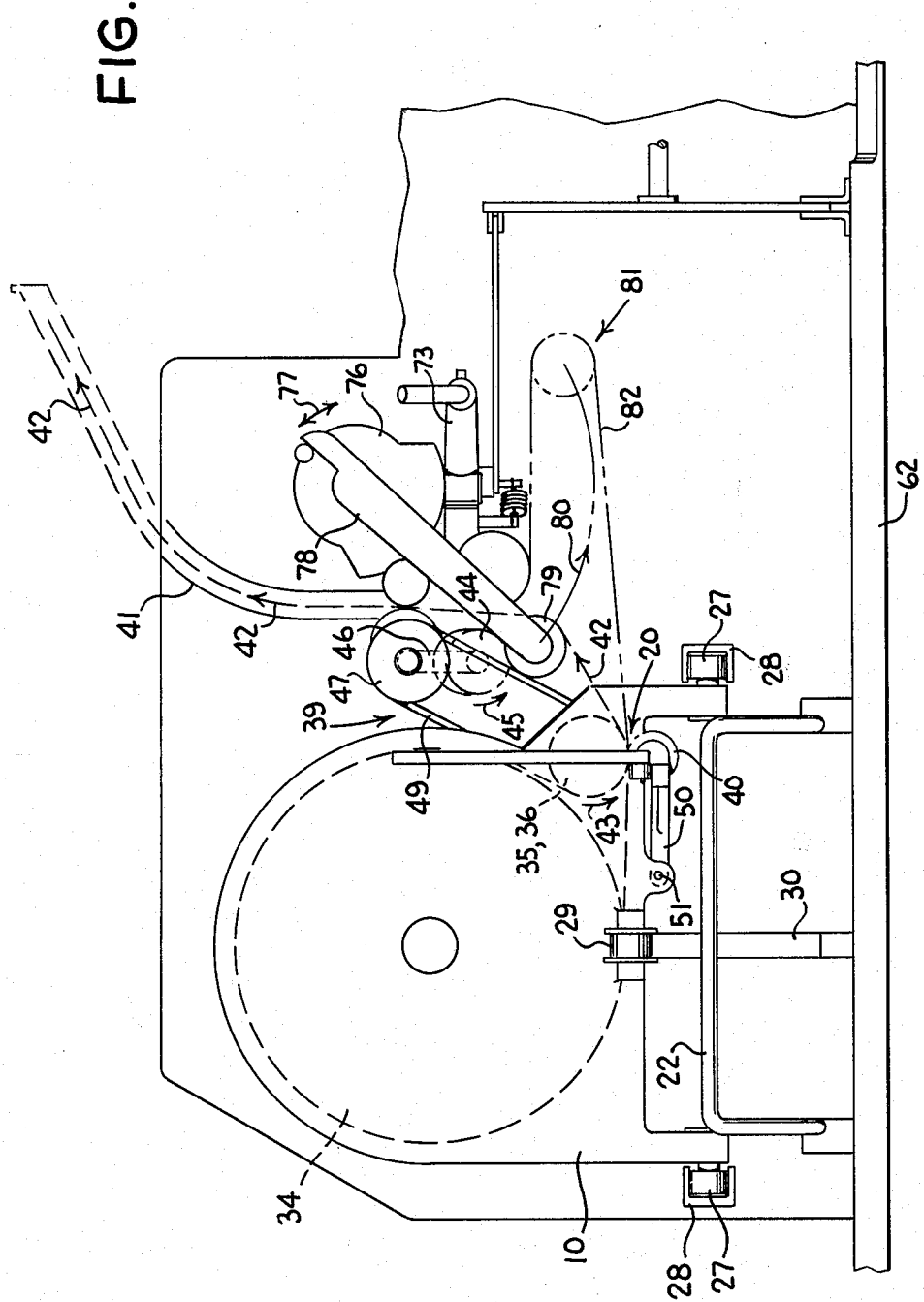
FIG. 5 is a front view of the inventive postage tape receptacle and receptacle positioning apparatus of FIGS. 2 and 3 shown in situ within the tape dispensing machine.

In the dispensing position the tape 12 is squeezed between the pinch rollers 17 so that as pulley wheel 36 is caused to turn counterclockwise, (arrow 43) the roller 35 is also turned causing the tape 12 to advance (arrows 42) into the guide 41 (see FIG. 5).

The pulley system 39 is actuated by turning knob 44 (FIGS. 5, and 6) in the counterclockwise direction (arrow 45, FIG. 5). The knob controls shaft 46. Shaft 46 is connected to pulley wheel 47 through flexible coupling 48. As the knob 44 is turned counterclockwise, the pulley wheel 47 is similarly rotated counterclockwise. The belt 49 connected between pulleys 47 and 36, respectively, then causes wheel 36 to also turn counterclockwise (arrow 43), thus advancing tape 12 as aforementioned.

The pinch roller assembly 17 comprises a stationary roller 35 and a displaceable roller 40 (FIGS. 3–5). The roller 40 is disposed upon a pivot arm 50, which pivots about point 51. When the arm 50 is made to pivot about point 51, the roller 40 is displaced into, or out of, engagement with roller 35.

The pinch roller assembly 17 also comprises a pivotable arm 52, which pivots about point 53. One end of the arm 52 has a contact roller 54, which engages pivot arm 50, and causes arm 50 to pivot in turn about its pivot 51. Pivot arm 50 is spring loaded about pivot 51, so that it always remains in contact with roller 54.

OPERATION OF THE LOADING DEVICE

When receptacle 10 dispenses all of the tape on roll 11, the door 62 is opened and the handle 24 of the slide bar 22 is pulled outwardly (arrow 55, FIG. 2) from the dispensing apparatus, causing the receptacle to achieve an accessible tape loading position as shown in FIG. 2.

The old tape mandrel 16 is then removed, and the container is loaded with a new roll of tape as shown by arrow 9 in FIG. 1. The tape tongue 12 of the tape roll 11 is inserted between pinch rollers 35 and 40, which are in the separated condition. The lip of the tongue 12 is torn off to form an even edge by forcing the end of the tape against knife edge 85 of container 10. An even edge is necessary to advance the tape through guide 41. The separation of the pinch rollers is accomplished by means of abutment 56 as shown in FIGS. 2 and 3. The abutment 56 forces the actuating arm 52 towards the container 10 (arrow 57). As the receptacle assembly is pulled out to the accessible position of FIG. 2, the arm 52 contacts the abutment 56, causing arm 52 to pivot about its pivot 53 (arrow 57), thus causing pivot arm 50 to pivot outwardly as depicted by arrow 58. When arm 50 pivots in direction 58, the displaceable roller 40, which is attached to arm 52 moves out of engagement with roller 35, thus allowing the operator to thread tongue 12 of tape 11 between the pinch rollers.

After the tape 11 is loaded into container 10, and the tongue 12 of the tape is placed between the pinch rollers, the slide bar 22 is pushed inwardly (arrow 33 of FIG. 3).

The receptacle 10 is moved inwardly, (arrow 25) and then begins to pivot (arrow 27) about guide rollers 27 as the roller 29 advances upwardly (arrows 59) upon track 30. The container moves toward lid 34 (arrow 31), where the tip 60 (FIGS. 1 and 2) of shaft 14 seats within aperture 61 of the lid, and teeth 37 of roller 35 attempt to mate with slots 38 of pulley wheel 36.

When the slide bar 22 is pushed inwardly (arrow 33), the actuating arm 52 slides off of the abutment 56, causing the pinch rollers 17 to come into engagement. This results in trapping tongue 12 of the tape 11 between the pinch rollers 35 and 40.

When the receptacle 10 reaches its dispensing position (FIG. 6) (engages lid 34), the knob 44 is turned to cause the pinch roller 35 to turn. This causes the tongue of the tape to advance through aperture 20 (FIG. 1) in the container, and move into guide 41 (arrows 42 of FIG. 5). The tape is guided upwardly towards tape guide 41, by a pivotable guide element (not shown).

When the tape is fully advanced through guide 41 the operator stops turning knob 44. The lid 62 (FIGS. 2 and 6) of the dispensing machine is then pivoted (arrow 63) about hinge pin 64, thus enclosing the dispensing apparatus.

The knob 44 can also be rotated in a clockwise direction to remove tape from guide 41. This ability of removing tape is useful in case jamming occurs.

In closing the lid 62, a rod 66 pivotably connected to the lid 62 at point 67 is forced inwardly as shown by arrow 65. This causes bell crank 68 to pivot (arrow 70) about pin 69. This in turn results in pulling rod 71 outwardly (arrow 72).

When rod 71 is pulled outwardly, a gear 73 is caused to rotate forcing arm 74 to pivot (arrow 75) towards actuation arm 52 of the pinch roller assembly (see FIG. 4). The arm 74 forces actuation arm 52 towards the receptacle 10 as depicted by arrow 57. This in turn causes the pinch rollers 35 and 40 to separate, thus freeing the tape 11 disposed therebetween.

Now, as the tape is pulled along track 41 by the dispensing apparatus, (not shown) the tape is free to be pulled from aperture 20. This causes the tape roll 11 to spin within the receptacle, which provides a continuous supply of tape to guide 41.

In addition to actuating arm 74, the turning of the gear 73, also causes the engaging gear 76 to turn in direction 77 as shown in FIG. 5. As gear 76 rotates, pivot arm 78 pivots to force roller 79 in direction 80.

Roller 79 swings to a position generally shown by arrow 81. This produces a loop 82 in the tape, so that there will be slack in the tape as it is dispensed. This prevents tearing of the tape as it is drawn along guide 41.

The spirit and scope of this invention is not to be limited by any obvious modifications which would naturally occur to a skilled practitioner in this art.

The drawings are considered to be merely exemplary, and only one of several ways of achieving the inventive concept. The detailed description is only meant to provide an understanding of the invention, as presented by the appended claims.

What is claimed is:

1. A postage meter tape receptacle system for loading postage meter tape into a postage tape dispensing machine, comprising:
   a container for receiving and dispensing a quantity of postage meter tape;
   support means including a linear guide track means for supporting and guiding said container for movement within said dispensing machine, said support means supporting said container in a horizontal position with respect to the dispensing machine when tape is being received by the container, and supporting said container in a vertical position with respect to the dispensing machine when tape is being dispensed from said dispensing machine; and
   means for slidably and pivotably moving said container from a tape receiving position to a tape dispensing position, said means for moving the container including a central camming track at least a portion of which is inclined with respect to said dispensing machine to provide movement of the container from the horizontal to the vertical position.

2. The postage meter tape receptacle system of claim 1, wherein said means for moving said container between said receiving position and said dispensing position, further comprises a push-rod mechanism movably supported by said dispensing machine and secured to said container.

3. The postage meter tape receptacle system of claim 2, wherein said push-rod mechanism comprises a pair of push-rods, each supported and guided for movement with respect to said dispensing machine, each of said push rods being connected to said container at one end thereof, and being connected to each other at an opposite end thereof to form a hand holdable loop capable of being grasped and pushed to cause said container to move with respect to said dispensing machine.

* * * * *